United States Patent [19]
Christensen

[11] Patent Number: 5,238,280
[45] Date of Patent: * Aug. 24, 1993

[54] UTILITY RACK WITH ENHANCED RAILS

[76] Inventor: David Christensen, 11 Moores Mill Rd., Pennington, N.J. 08534

[*] Notice: The portion of the term of this patent subsequent to Aug. 11, 2009 has been disclaimed.

[21] Appl. No.: 908,979

[22] Filed: Jul. 6, 1992

Related U.S. Application Data

[63] Continuation-in-part of Ser. No. 762,575, Sep. 19, 1991, Pat. No. 5,137,320.

[51] Int. Cl.$^5$ .................................. B60P 3/00
[52] U.S. Cl. ............................................ 296/3
[58] Field of Search .................. 296/3; 224/42.42

[56] References Cited

U.S. PATENT DOCUMENTS

| | | | |
|---|---|---|---|
| 2,134,823 | 11/1938 | Herrmann et al. | 248/361 |
| 3,877,624 | 4/1975 | Carson | 224/42.42 |
| 4,065,041 | 12/1977 | Shegavig et al. | 296/3 |
| 4,390,117 | 6/1983 | Fagan | 224/310 |
| 4,444,427 | 4/1984 | Martin | 296/43 |
| 4,984,837 | 1/1991 | Dise | 296/3 |
| 5,002,324 | 3/1991 | Griffin | 296/3 |

Primary Examiner—Robert R. Song
Attorney, Agent, or Firm—Kenneth P. Glynn

[57] ABSTRACT

The present invention is a ladder utility rack for pick-up cargo beds. It has two parallel horizontal base rails and at least two vertical stanchion units. Each base rail has at least three contiguous walls, including at least one horizontal and one vertical running wall and each is adapted to nest atop and against sidewalls of a cargo bed These base rails are not connected to one another except via the stanchion units These units have vertical legs running from each of the base rails upwardly and inwardly and terminate at a commonly connected horizontal cross member A preferred embodiment includes rails which are unistructurally formed, e.g. extruded, including portions in the form of an upright or inverted "U".

18 Claims, 4 Drawing Sheets

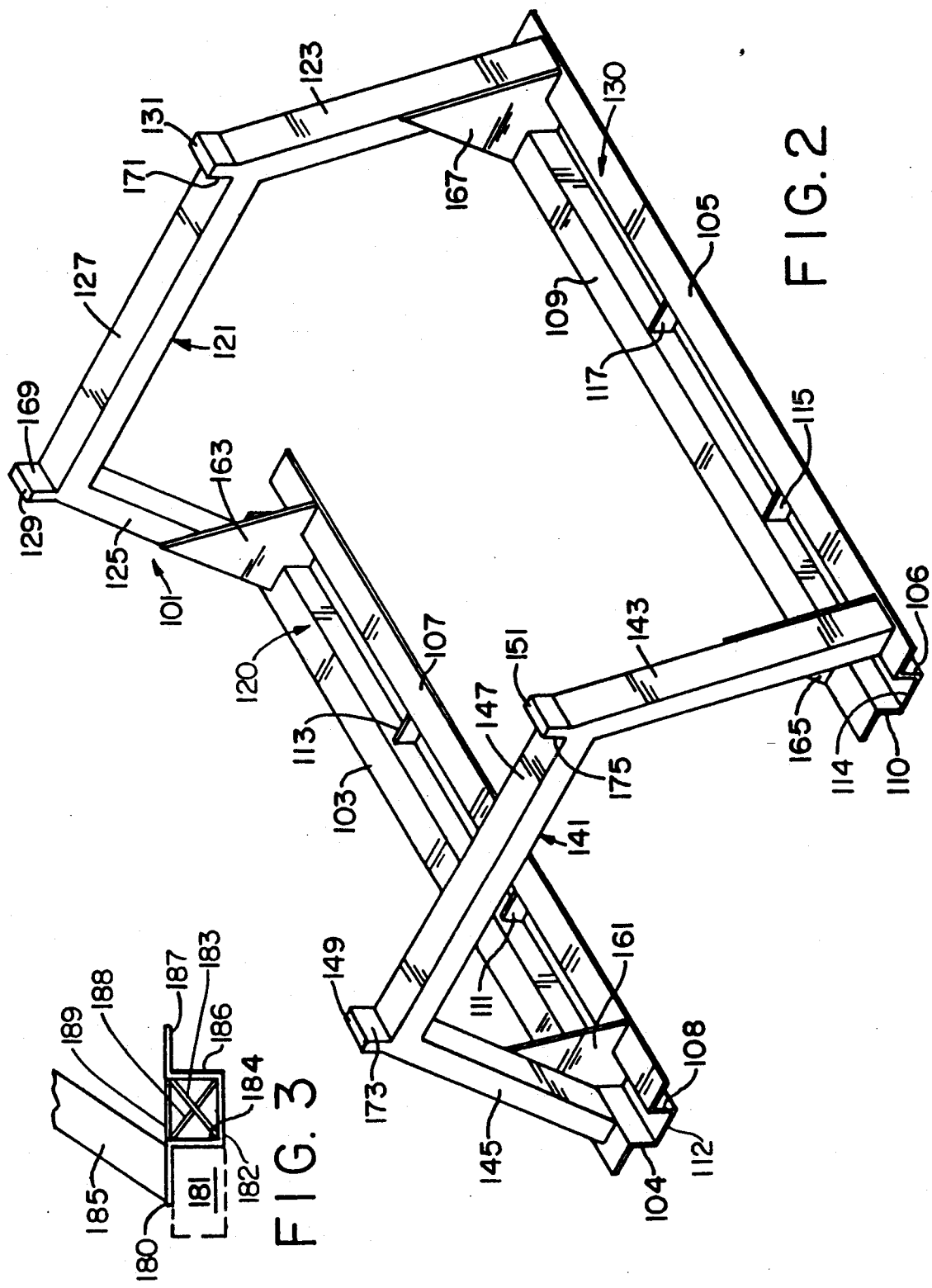

UTILITY RACK WITH ENHANCED RAILS

REFERENCE TO RELATED CASE

This application is a continuation-in-part of copending U.S. patent application Ser. No. 07/762,575, filed on Sep. 19, 1991 entitled "Ladder Utility Rack and Mounting Rail" by the same inventor herein.

BACKGROUND OF THE INVENTION

1. Field of the Invention

This invention relates to utility racks for pick-up truck cargo beds and particularly such utility racks for carrying ladders and other items of substantial length which may typically exceed the length of a cargo bed. The invention also relates to such utility racks as they include enhanced rails, such as unistructurally formed rails, to create platforms for mounting items to be transported, e.g. tool boxes, storage bins, adapter plate mounted machinery, generators, compressors, and the like.

2. Prior Art Statement

With the development of cargo bed trucks came racks to support items for transport—frames for carrying lumber, glass, ladders, etc. They were initially made of wood and took on a box-like open frame configuration. Subsequently, metal racks were developed to increase both strength and longevity. While the development of ladder utility racks and other racks did not stand still, most improvements pertained to "enhancing" the basic open box-like framing by adding to it rather than changing the framing configuration itself.

U.S. Pat. No. 2,134,823 describes a 1938 ladder rack which is side mounted and includes a complex clamping lever U.S. Pat. No. 3,877,624 describes a ladder rack involving a plurality of bows which transverse the top of a closed truck, wherein one of the bows has clamps to clamp ladders. The bows are independently attached to the vehicle and are not connected in any fashion. Further, they appear not to be adaptable to cargo beds for carrying items having lengths greater that the cargo bed.

U.S. Pat. No. 4,390,117 describes a ladder rack for vehicles involving parallel side members and transverse cross members. It is adapted for mounting on the roof of a vehicle and, again, would not be effective for a pick-up bed. Also, complex rack attachment and ladder attachment mechanisms are included.

U.S. Pat. No. 4,444,427 teaches an auxiliary structured element for pick-up cargo beds which includes a four sided frame and subsequent cross members for mounting a deck, e.g. a top with an access door.

U.S. Pat. No. 4,984,837 is directed to a load support assembly for pick-up trucks. This device has vertical mounting supports and a tiltable load support cross member. It is used for transporting items in the cargo bed tilted upwardly and forwardly; it is cab mounted and cannot carry lengthy items in a horizontal position.

Most recently issued U.S. Pat. No. 5,002,324 describes a utility rack for pick-up cargo beds. The rack has two inverted "U" type stanchions attached to a continuous rail that encompasses both sidewalls and the forward wall of the cargo bed, itself forming a "U" type configuration in the horizontal plane. The rear stanchion is movable and removable. This is different from the present invention in the extra weight and material required for the forward wall section of the continuous rail, whereas the present invention relies upon parallel rails not connected directly to one another. It is also more difficult to install since this prior art device has exact fixed width of separation of the rail due to the direct connection. It is also subject to loosening and wearing of the rear stanchion mounting parts and even subject to the possibility of accidental disassemblage of the rear stanchion. Finally, because of the need for close tolerances of the rear stanchion and its mounts, the precise separation of the rail at its rear portion is essential to enable a user to subsequently mount the rear stanchion. None of those shortcomings exist with the present invention device.

SUMMARY OF THE INVENTION

The present invention is a ladder utility rack for pick-up cargo beds. It has two parallel horizontal base rails and at least two vertical stanchion units. Each base rail has at least three contiguous walls, including at least one horizontal and one vertical running wall and each is adapted to nest atop and against sidewalls of a cargo bed. These base rails are not connected to one another except via the stanchion units. These units have vertical legs running from each of the base rails upwardly and inwardly and terminate at a commonly connected horizontal cross member. A preferred embodiment includes rails which are unistructurally formed, e.g. extruded, including portions in the form of an upright or inverted "U".

BRIEF DESCRIPTION OF THE DRAWINGS

The present invention should be more fully understood when the specification herein is taken in conjunction with the drawings appended hereto, wherein:

FIG. 2 shows a top perspective view of an alternative present invention utility rack with enhanced mounting rails;

FIG. 3 illustrates a partial end cut view of one side of yet another alternative present invention utility rack;

DETAILED DESCRIPTION OF THE INVENTION

The utility rack of the present invention has as one of its objectives to provide a rack which is durable and yet less complex than conventional racks. It is also an objective to provide a utility rack which has an inwardly biased horizontal cross section for receiving ladders and the like away from the outer periphery of the vehicle. It is also an objective to provide an easily installable rack which may be adapted for acting as a platform for mounting other items for transport, such as tools, tool boxes, storage bins, generators, pumps, gas motors, etc.

Figure 1:
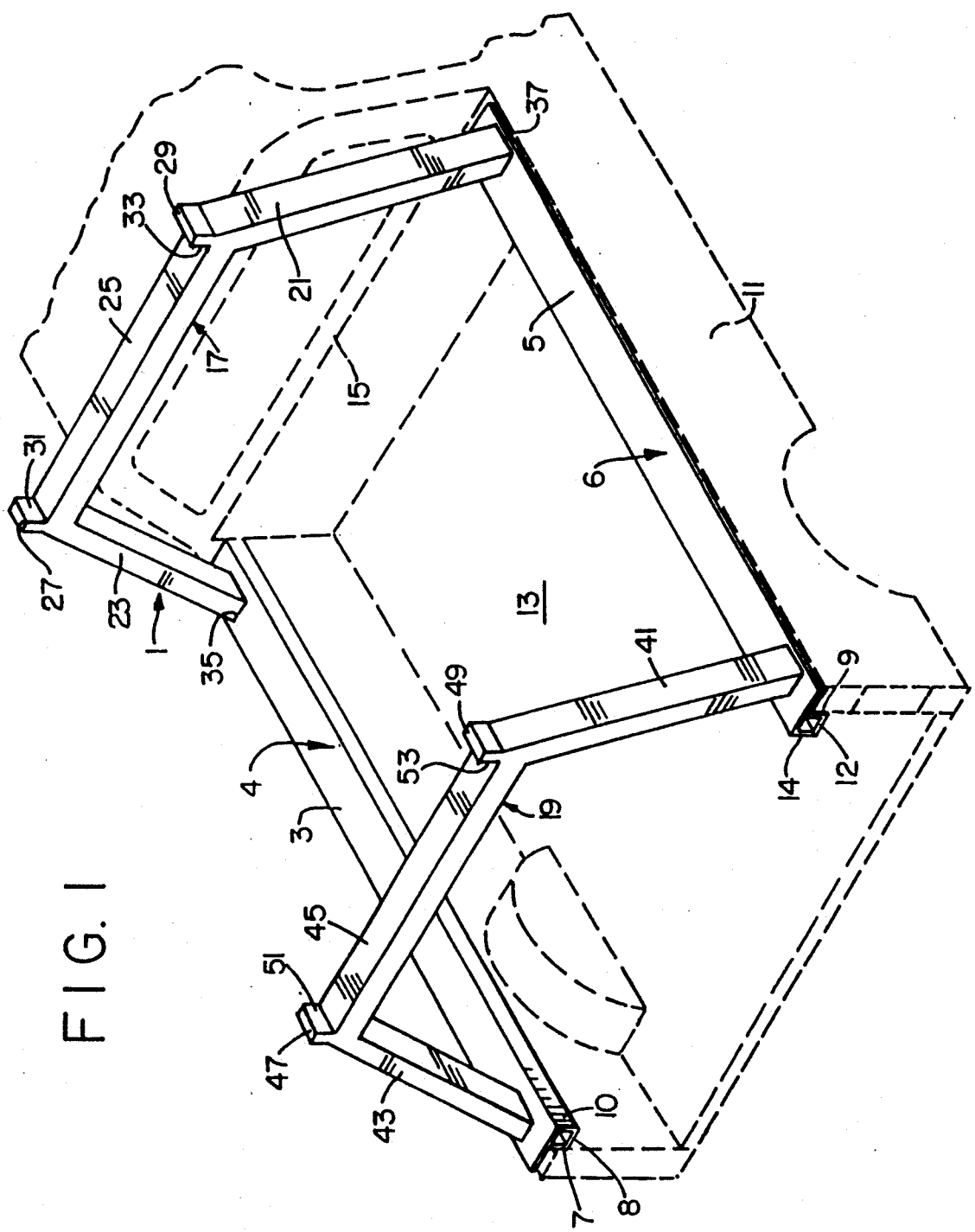
FIG. 1 shows a top perspective view of a present invention utility rack with unistructurally formed rails.

Referring now to FIG. 1 there is shown a top perspective view of a utility rack 1 mounted on cargo bed 13 of pick-up truck 11. A pair of base rails (left and right looking at the rear end of truck 11) are each unistructurally formed, e.g. by extrusion. Left rail 4 includes more than three contiguous (directly touching or connected) walls, including horizontal walls 3 and 8 and vertical walls 7 and 10, wall 3 being wider that wall 8 so as to extend outwardly as shown. Right base rail 6 includes horizontal walls 5 and 12 and vertical walls 9 and 14, as shown. The horizontal walls 3 and 5 extend to nest atop the sidewalls of cargo bed 13 and the vertical walls 7 and 9 seat against the sidewalls, as shown. They may be bolted down, welded, or affixed by any known means.

Utility rack 1 includes stanchion units 17 and 19. Front stanchion unit 17 is attached to horizontal base rail walls 3 and 5 at the lower portions 35 and 37 of vertical legs 23 and 21, e.g. by welding, bolting, a combination of these, or other known means of attachment. The vertical legs 21 and 23 extend upwardly and inwardly and are mounted forwardly, as shown, and are connected by horizontal cross member 25. Lateral support blocks 27 and 29 are atop cross member 25 and, although optional, are preferred. These keep ladders, lumber, pipes, etc. from sliding or rolling off laterally at their inside surfaces 31 and 33. Also, due to the inward configuration of the vertical legs (e.g. 21 and 23) such items as ladders are transported away from the outer periphery of the pick-up truck. This becomes important when the truck is in motion and turning. The center of gravity is better maintained and there may be less tipping. This is safer and will cause less wear of shocks and springs. Also, note that the stanchions are not connected directly to one another but are connected by horizontal cross members, as shown.

Rear stanchion unit 19 has vertical legs 41 and 43 and these are similarly attached to the base rails as are legs 21 and 23. Also, they generally have the same cross sections, angles, sizes, etc., as the forward stanchion unit, and, although an exact replication is not critical, it is preferred.

FIG. 2 shows a top perspective view of alternative utility rack 101. Here, the base rails have cross sections shaped like "U"'s with extended wings. Walls 103, 104, 112, 108 and 107 are formed of a single, extruded metal or heavy duty plastic. Running horizontal wall 103 and running horizontal wall 105 nest atop opposite sidewalls of a cargo bed (not shown) and their vertical walls 104 and 106 fit against the sidewalls. Rear stanchion unit 141 includes vertical legs 143 and 145, attached to the base rail horizontal walls 105 and 103, as shown. They terminate upwardly and inwardly at cross member 147 and this embodiment includes optional lateral support blocks 149 and 151 with inside surfaces 173 and 175 to stop lateral shift of load off of the rack.

Forwardly attached stanchion unit 121 likewise includes vertical legs 123 and 125, horizontal commonly connected cross member 127 and support blocks 129 and 131 with inside stop surfaces 169 and 171.

In this version, auxiliary wall sections are included to provide for mounting platforms. Thus, horizontal walls 107 and 109 are extended inwardly. The "U"-shaped rails 120 and 130 are reinforced with flat spacers 111, 113 and 115, 117, as shown. Thus, rails 120 and 130 have a cross section which includes horizontal and vertical walls and are attached with the extended horizontal walls directed inwardly, as shown. In some embodiments such as is shown in FIG. 2, they have a mirror image cross section to one another and may be sectioned or full length. Optional support plates 161, 163, 165 and 167 have a triangle and base configuration and are inserted between vertical walls 104 and 108 and between vertical walls 106 and 110, as shown, and are also attached to horizontal walls 103, 107, 105 and 109, as shown. Finally, they are connected to the vertical legs 143, 145, 123 and 125, as shown.

FIG. 3 shows an end view of a partial cut looking into the left end of an alternative rack. Bed wall 181 is shown with horizontal wall 180 on its top and vertical wall 184 on its side; these being connected by welding (or bolts, not shown) or being unistructurally formed as one extruded piece. Walls 182, 186 and 187 are also formed as shown. Here, rods 187 and 188 form periodic criss-cross spacers and top rod 189 further enhances the strength of the rail.

Figure 4:
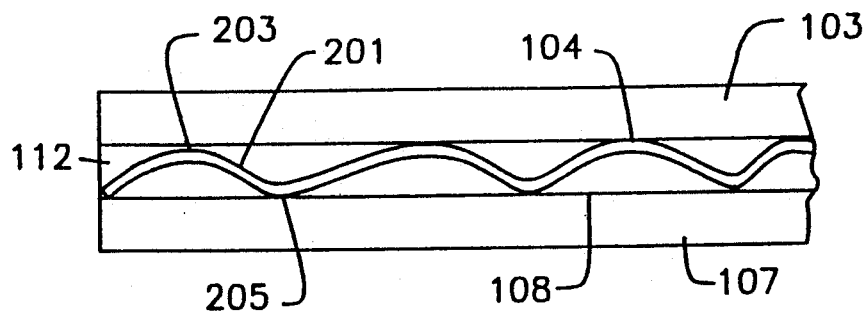
FIG. 4 shows a top view of an alternative base rail which may be used in a present invention utility rack.

FIG. 4 shows a top view of an alternative shape for a present invention rack base rail. Here, the base rail is the same as rail 120 shown in FIG. 2, except that, is the "U" portion is a single, elongated waved sheet of metal 201. The walls are numbered as in FIG. 2. Welding is along the bottom of metal 201 as well as at vertical wall contact points, such as 203 and 205.

Figure 5:
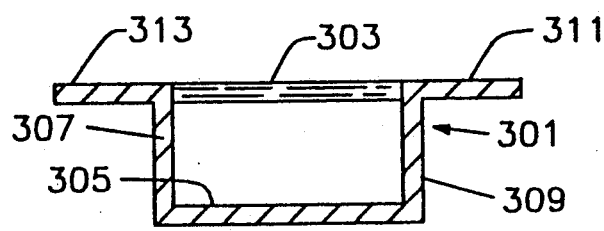
FIG. 5 shows an end cut view of a rail used in the present invention which includes welded rods.

FIG. 5 shows an end cut view of a rail 301, having walls 313, 307, 305, 309 and 311, as shown. It is unistructurally extruded and reinforced with spacers such as spacer 303, which are attached by being welded, for example. These spacers may be flat sectional spacers welded in a horizontal position or maybe bar or rod stock or stock having interstices such as mesh or open lattice materials.

Figure 6:
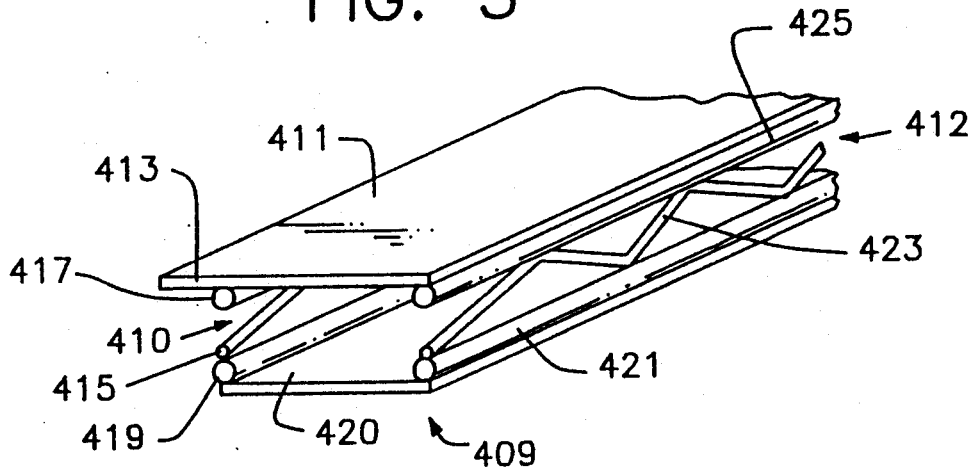
FIG. 6 shows an alternative rail member illustrating an oblique cut view.

FIG. 6 shows an alternative configuration oblique cut view of a rail member 409, having a generally rectangular shape and having a wider top vertical wall 411 with extension portion 413 for attachment to a truck bed wall. Vertical walls 410 and 412 are made up of rod trusswork, e.g. straight rods 417 and 419 and reinforcement waved rod 415 make up truss wall 410 and rods 421, 423 and 425 make up truss wall 412. They are welded or otherwise attached to horizontal wall 411 and 420, as shown.

Figure 7:
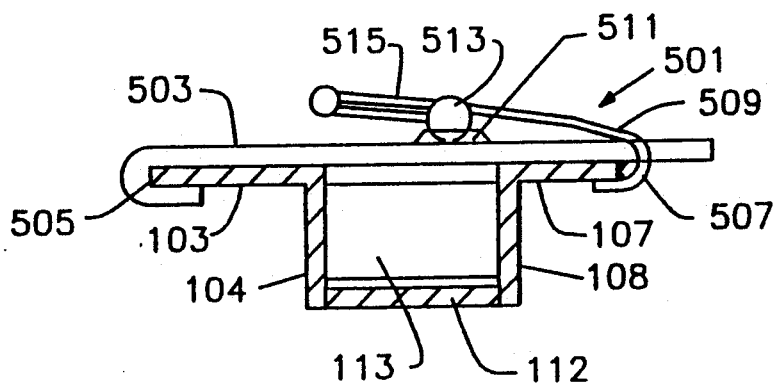
FIG. 7 illustrates an end cut view of a base rail and mounting rail shown in FIG. 2, but includes a mounting latch and baseplate.

Referring back to FIG. 2 and now also to FIG. 7, there is shown in FIG. 7 a cut end view of base rail horizontal walls 103 and 107 with a mounting latch 501 attached thereto.

Vertical walls 104 and 108 are connected to horizontal wall 112 and reinforced with spacer plate 113. Base plate 503 includes a hooked end 505. Permanently attached thereto is an over-the-center latch 515, also called an over-the-center clamp, with axle 513, attachment frame 511 and attachment strap 509, with hook 507 passing through an orifice in base plate 503 and attached to horizontal wall 107. Not shown on base plate 503 would be any item desired to be transported and these could be temporarily or permanently attached to base plate 503. These could include but would not limit to tool boxes, storage bins, holders for equipment, motors, generators, pumps, power tools, display advertising boards or any other item. Additionally, the latch 501 could itself be incased within a lockable tool box or other lockable container or even be itself lockable. The rails may be joined with a single, horizontal spacer so as to form a continuous mid-section. The present invention device may include other features on the rails and/or the stanchion units, such as reflectors, lights, mounting hooks or fasteners, etc.

Figure 8:
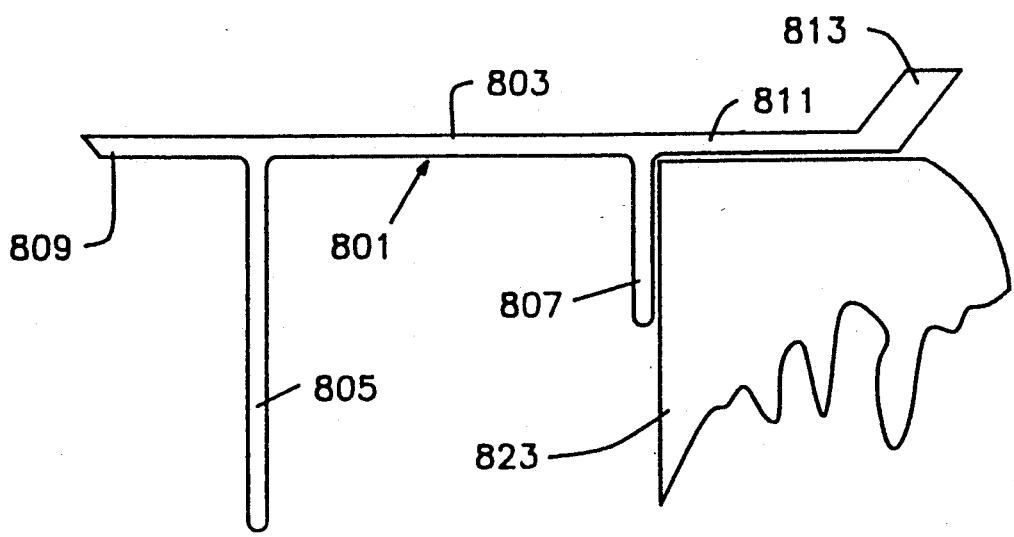
FIG. 8 shows an end view of an alternative rail for the present invention device using an inverted "U" configuration.

FIG. 8 shows an end view of alternative rail 801, having a top horizontal wall 803 with extensions 809 and 811, and contiguous vertical walls 805 and 807, as shown. Wall 807 and wall section 811 are attached to truck bed 823, e.g. by bolts (not shown). Angled end 813 is the terminus of wall section 811 and is adapted for nesting thereon of female counterpart accessories such as tool boxes, equipment mounts, etc.

Figure 9:
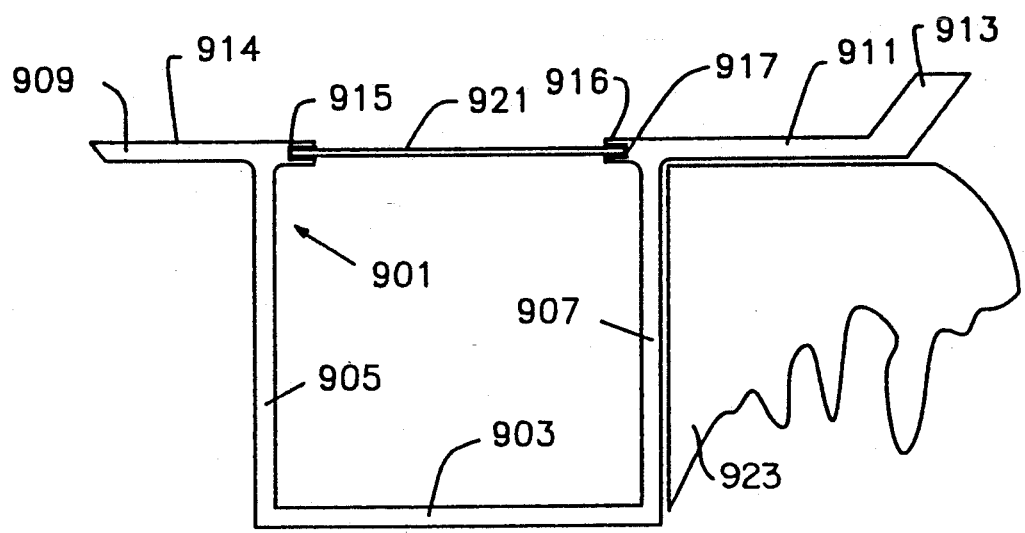
FIG. 9 shows an end view of another alternative rail for the present invention device with a sliding cover top to create a storage area; and, FIG. 10 shows yet another rail alternative with an inverted "U" configuration and guides for slide-on or snap-in attachments.

FIG. 9 shows an end view of alternative rail embodiment 901 with an upright "U" configuration. Base horizontal wall 903 is contiguous to vertical walls 905 and 907. Top walls 909 and 911 have inward extensions 914 and 916 with slots or guides 915 and 917 respectively. Plate cover 921 has the correct width to span across the top of rail 901 and fit into guides 915 and 917, as shown. Plate cover 921 acts to cover the otherwise open rail and to hide contents of the "box" or container created by the upright "U" configuration of the rail 901. Cover 921 could have a handle and a lock, as desired, and the end of rail 901 could further be secured by an end plate from base wall 903, up to but below guides 915 and 917 (to permit removal of cover 921). Further, cover 921 could be constructed in sections and slid back and forth with open areas and with vertical dividers to make a plurality of securable boxes within rail 901.

Figure 10:
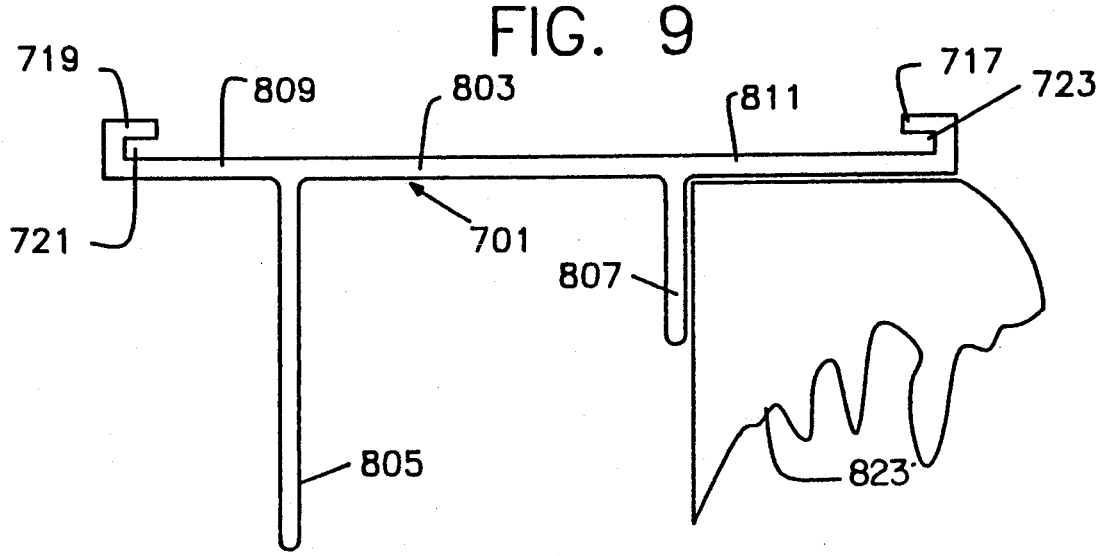

FIG. 10 illustrates an end view of another rail 701 with a general configuration of rail 801 shown in FIG. 8. Like parts are like numbered and need not be redescribed. Wall extension 809, in this embodiment, however, includes an upturned section 719 to create guide slot 721. Likewise, wall portion 811 has a similar section 717 which creates guide slot 723. These guide slots 721 and 723 are used for slip-in, slide-in, snap-in or otherwise attachable accessories such as tool boxes, equipment mounts tie down base plates and the like.

Obviously, numerous modifications and variations of the present invention are possible in light of the above teachings. It is therefore understood that within the scope of the appended claims, the invention may be practiced otherwise than as specifically described herein.

What is claimed is:

1. A utility rack for a pick-up truck cargo bed having two parallel walls and one forward wall, which comprises:
(a) two parallel base rails, each such base rail having at least three contiguous walls, including at least one running horizontal wall and at least one running vertical wall, at least one horizontal wall of one such base rail adapted to nest atop a first cargo bed parallel wall, at least one vertical wall of the same base rail adapted to fit against an inside wall of the first cargo bed parallel wall, and, one horizontal wall of the other such base rail adapted to nest atop a second cargo bed parallel wall, one vertical wall of the same rail adapted to fit against an inside surface of the second cargo bed parallel wall, said two base rails being unconnected to each other except by stanchions and having no base rail along a cargo bed forward wall;
(b) two vertical stanchion units generally of an inverted "U" shape, each of said stanchion units having a pair of vertical legs extending upwardly and inwardly to a commonly connected cross member, one vertical leg of one stanchion unit being connected to one said base rail forwardly and the other vertical leg of the same stanchion unit being connected to the other said base rail forwardly, and, one vertical leg of the other stanchion unit being connected to one said base rail rearwardly and the other vertical leg of same stanchion unit being connected to the other said base rail rearwardly.

2. The utility rack of claim 1, wherein said base rails are formed of right angle pieces.

3. The utility rack of claim 1, wherein said stanchion units are formed of tubular material.

4. The utility rack of claim 3, wherein said stanchion units are tubular metal.

5. The utility rack of claim 3, wherein said stanchion units are formed of tubular plastic.

6. The utility rack of claim 1, wherein said stanchion units include at least two lateral support blocks atop each of said commonly connected cross members.

7. The utility rack of claim 2, wherein said stanchion units include at least two lateral support blocks atop each of said commonly connected cross members.

8. The utility rack of claim 1, wherein said rails have a "U"-shaped configuration with at least one spacer located within the "U"-shaped configuration to enhance the strength of the rails.

9. The utility rack of claim 8, wherein said "U" shaped configuration is upright.

10. The utility rack of claim 9, wherein guides for receiving one or more accessories is included on said rails.

11. The utility rack of claim 8, wherein said "U" shaped configuration is inverted.

12. The utility rack of claim 11, wherein guides for receiving one or more accessories is included on said rails.

13. The utility rack of claim 8, wherein at least one spacer connects wall of said base rails at an area adjacent to each of the vertical legs of the stanchion units and said spacer extends upwardly and is further connected to at least a portion of said vertical leg to create additional structural support.

14. The utility rack of claim 8, wherein said spacers are rods.

15. The utility rack of claim 8, wherein said base rails are formed of right angle pieces.

16. The utility rack of claim 1, wherein said vertical walls are formed with an open structure.

17. The utility rack of claim 16, wherein said open structure walls are formed of rod trusswork.

18. The utility rack of claim 8, wherein said stanchion units are tubular metal.

* * * * *